July 10, 1962         A. G. LAUCK ETAL         3,043,447
ARTICLE TAKE-OUT MECHANISM
Filed Dec. 12, 1957                           3 Sheets-Sheet 1
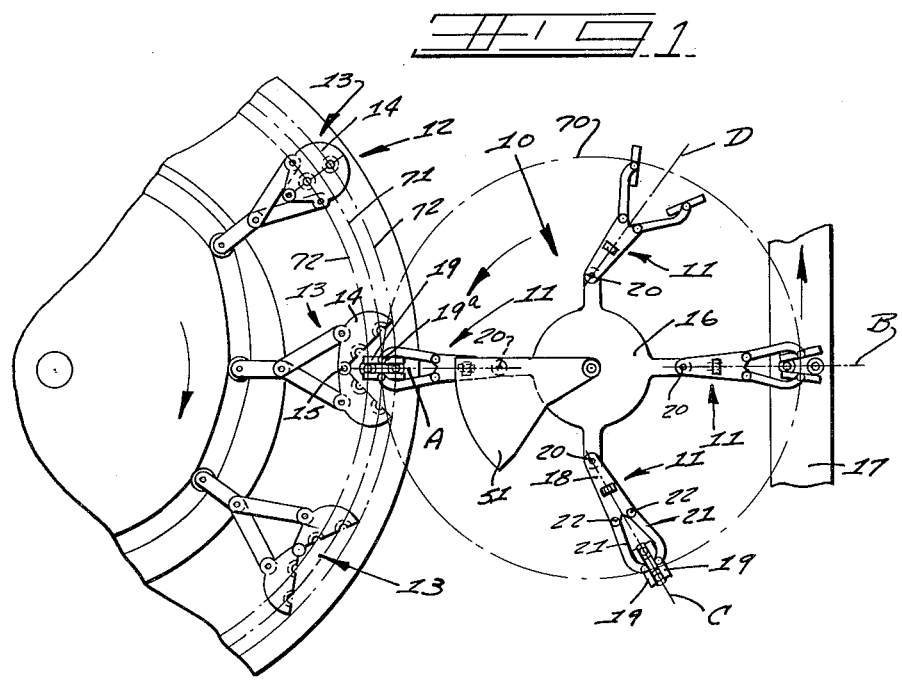
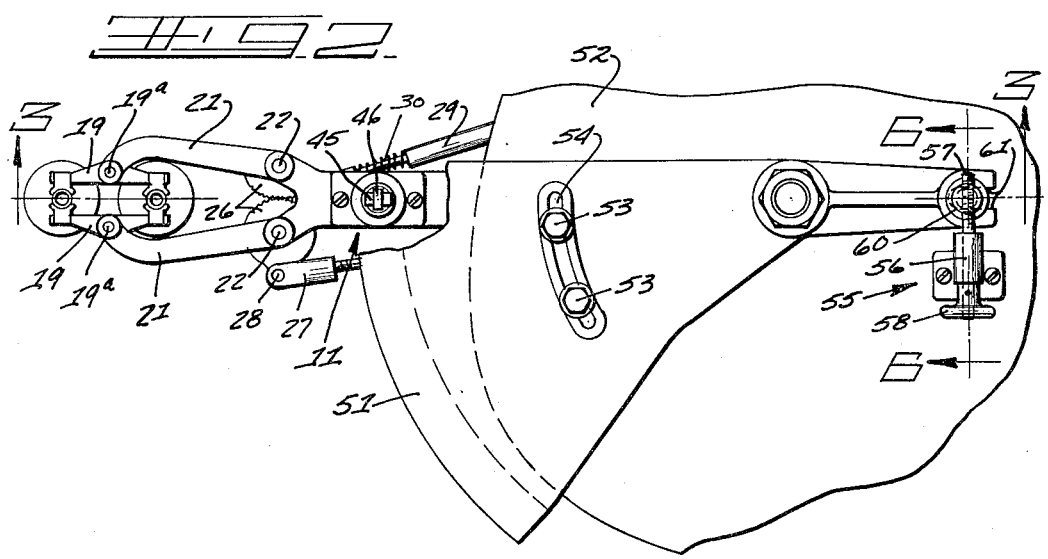
INVENTORS
ROBERT A. KURTZ
BY ALBERT G. LAUCK
J. B. NELSON
W. A. SCHAICH
ATTORNEYS

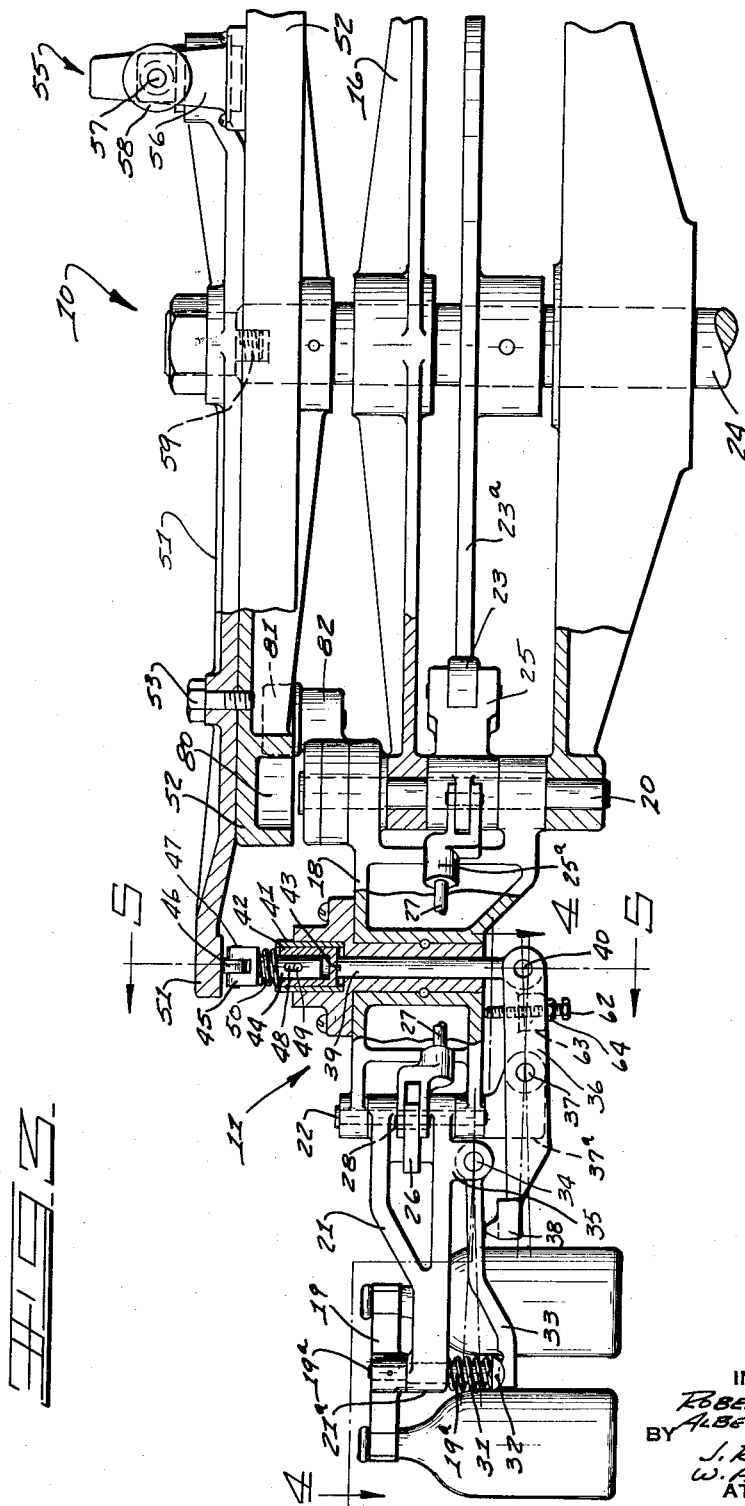

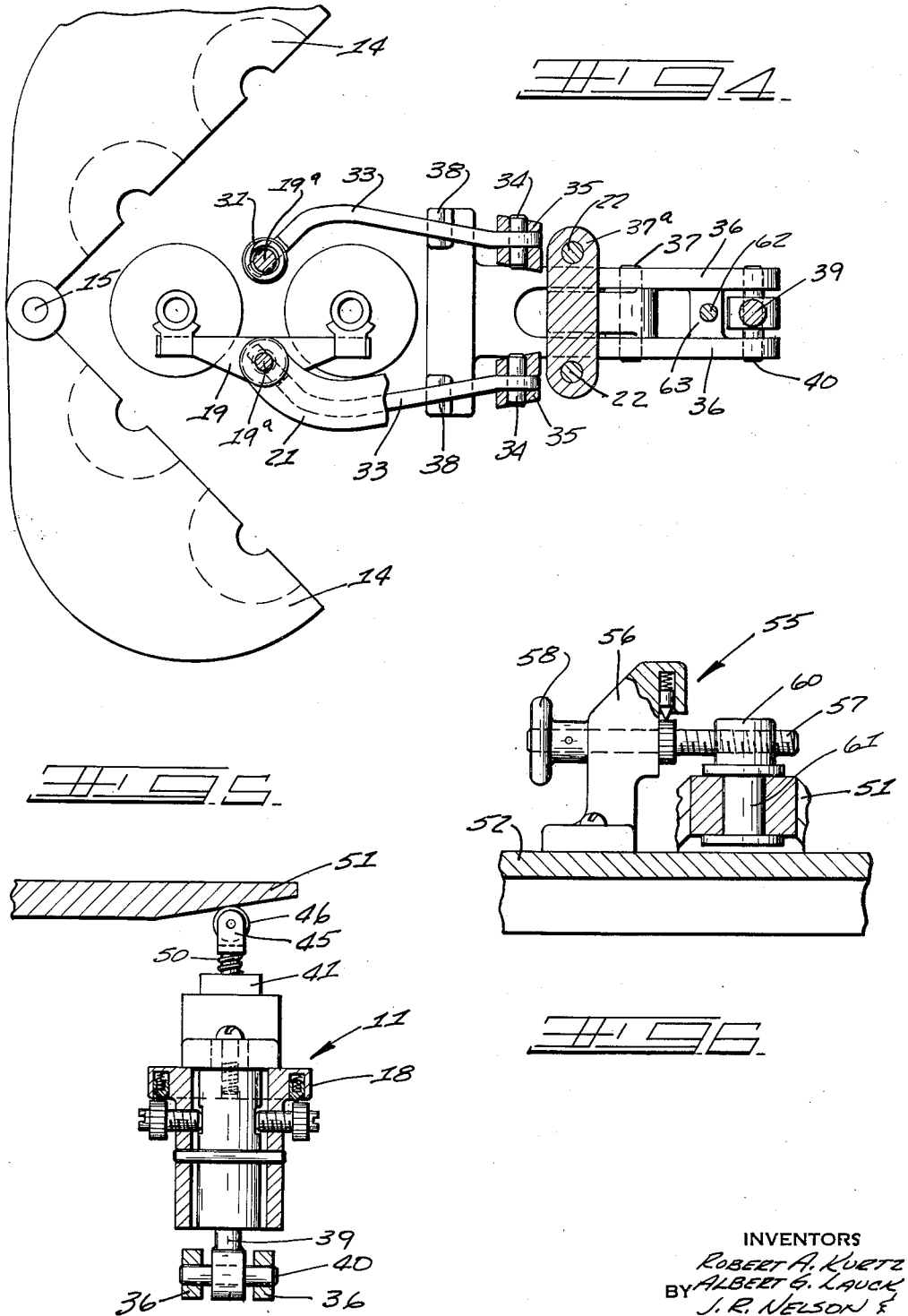

United States Patent Office 3,043,447
Patented July 10, 1962

3,043,447
ARTICLE TAKE-OUT MECHANISM
Albert G. Lauck and Robert A. Kurtz, Toledo, Ohio, assignors to Owens-Illinois Glass Company, a corporation of Ohio
Filed Dec. 12, 1957, Ser. No. 702,402
9 Claims. (Cl. 214—1)

The present invention relates to improved means for taking out molded articles, such as bottles, jars, or the like, from forming molds—for example, the molds of a glassware blowing machine—and transferring them to an article receiving means, such as a conveyor, whereupon they are discharge thereat for carriage to a remote location for further processing of the article.

The invention in the form herein illustrated and described is particularly adapted for taking bottles from the finishing molds of a bottle blowing machine and carrying them to a nearby straight-line conveyor whereat they are discharged onto the conveyor in an up-right position.

The present invention is applied as an improvement to a take-out device similar to that disclosed in a copending application of Russell G. Allen, Serial No. 446,043, filed July 27, 1954, now Patent No. 2,888,131, and owned by assignee of this application.

The take-out machine to which this invention is applied includes a carriage or turret rotatable about a vertical axis and is provided with radially disposed take-out arms, each carrying a pair of gripping elements or article holding means adapted to take hold of a bottle or bottles as the latter are carried in the open molds of the blowing machine. The opening and closing movement of the take-out arms is cam controlled and the gripping elements are mounted on a carrying frame having pairs of arms adapted for movement toward and away from each other for opening and closing these elements about the articles. The carrying frames and their arms on which the gripping elements are mounted may be cam controlled also, such that the tongs will travel with and at the same speed as the mold as they approach the transfer point and during transfer, and their speed reduced at the time of release of the articles to the traveling conveyor. This latter feature permits the conveyor to be running at a slower speed than the linear speed of the articles while they are carried by the rotating molding table of the blowing machine.

The take-out tongs travel through a take-out station whereat the tongs and the article undergoing take-out from the mold are traveling at the same linear speed and take-out occurs as their paths of circular movement strike a tangent so that the relative speed between them is zero. After the take-out arm grips the bottle, the two paths separate and the bottle is moved laterally away from the mold. Heretofore, such a method of take-out necessarily requires a supported bottle to be dragged from the mold bottom which supports it. The friction of the drag of the bottles over the mold bottom during their relative lateral movements tends to harm the bottle by scratches, etc. which sets up harmful stress patterns in the glass. To eliminate drag on the bottom plates and subsequent damage to the bottle therefrom the blowing machines have been provided with additional mechanisms to lower the mold bottom at the time the bottle is gripped but prior to take-out. The added mechanism on the blow machine to accomplish this is necessarily complex and materially increases blowing machine maintenance. Moreover, it has been found that carbon builds up on the bottom plate lowering mechanism which often causes it to stick or otherwise fail to operate.

It is, accordingly, an object of the present invention to provide apparatus for taking out articles from a molding machine by lifting the articles from the mold after they are gripped but before lateral movement occurs between the article and the mold bottom. Also, an important object of the invention resides in provision of a means and step during the take-out process affecting vertical movement of the article at the time of take-out from the mold and before lateral movement of the article with respect to the mold to eliminate dragging of the article against the mold.

Another object of the invention is provision of a rotary take-out device for removing molded articles from a mold of a rotary molding machine without dragging the article against any surfaces of the mold.

Another object of the invention is to provide take-out apparatus for removing articles, as mentioned, by lifting them free of the mold before moving them laterally with respect to the mold; and provision for such apparatus that is simple of construction and requires a minimum of maintenance.

A further object of the invention is to provide a novel apparatus for lifting the article gripping mechanism of the take-out device and the article gripped thereby, and including a safety feature included in actuation of such gripping mechanism that will prevent breakage or damage to it in case it becomes jammed at the take-out station.

Other objects and advantages will become apparent from the following description of the accompanying drawings, on which:

FIG. 1 is a diagrammatic plan view showing the relation of the take-out apparatus and the blowing machine.

FIG. 2 is a plan view of the take-out arm of this invention.

FIG. 3 is an elevational view, partly in section, of the take-out arm shown in FIG. 2, and illustrates in detail the actuating mechanism for the article gripping elements.

FIG. 4 is a plan view, partly in section, taken along lines 4—4 of FIG. 3.

FIG. 5 is a sectional elevational view, taken along lines 5—5 of FIG. 3, showing the stationary cam located opposite the take-out station engaged to actuate the gripping elements to lift a gripped bottle from a mold bottom.

FIG. 6 is a sectional elevational view taken along lines 6—6 of FIG. 2, and shows a means for adjustment of the cam with relation to the take-out station.

Referring to FIG. 1, the invention in the form illustrated is adapted to the take-out machine 10 provided with four take-out units or arms 11 equally spaced about the axis of the machine. A mold carriage 12 of a bottle blowing machine has mounted on it a plurality of equally spaced finished molding units 13. Each unit includes a finishing mold 14 having partible mold sections which are rotatable about a pivot 15 to and from a closed molding position. The mold carriage 12 is rotated continuously and opens each finishing mold 14 as it approaches the take-out station A.

The take-out machine 10 includes a turret 16 which is rotated continuously, thereby bringing the transfer arms 11 to the take-out station A to receive the finished articles from the molds 14 and carry them to a horizontal straight line conveyor 17. At the take-out station A the path of circular movement of take-out arms 21 and the path of circular movement of the formed articles carried in the molds 14 strike a point of tangency at the point of take-out at A. The rotation of turret 16 carrying the arms 11 is synchronized and indexed with the rotation and position of the molds 14 on the mold carriage 12 so that a mold 14 in open position and a take-out arm 11 will arrive at the take-out station together to enable the articles supported by the mold to be picked up and transferred. To achieve this, gripping means (which will be later described in detail) on the take-out arm 11 and the molded articles carried by the mold 14 travel at the same linear speed in their respective circular paths as each approach the tangent point at the take-out station A.

Each of the take-out arms 11 comprises a carrying frame 18 for article gripping elements 19, the carrying frame being pivotally mounted on the turret 16 by pin 20. Each carrying frame includes a pair of arms 21 pivotally mounted on the carrying frame 18 by pins 22. The means for mounting the gripping elements at the outer ends of their respective arms 21 will be presently described in detail in connection with FIG. 3.

The means for opening and closing the pairs of arms 21 includes a stationary cam plate 23a keyed to the stationary center column 24 of the take-out machine (FIG. 3).

A rocker arm assembly 25 is mounted to rock on the pivot pin 20 and carries a cam follower roller 23 which runs on the cam 23a. A pair of intermeshing gear segments 26 are connected to pivot pin 22 for rotation with the arms 21. A rod 27 is pivoted at one end to one of the gears 26 by pin connection 28 and at its opposite end to a lug 25a on the rocker arm 25. Hence, the rocking movement of the rocker arm 25 under control of the cam 23a operates one of the arms 21 through link 27 and gears 26 open and close both the arms 21.

As is illustrated in FIG. 2, a rod 29 comprising telescoping sections, is pivotally connected at its opposite ends to the rocker arm 25 and the frame 18, respectively. A coil spring 30 mounted on one section of rod 29 holds the rocker arm 25 in contact with its cam 23a and thereby operates to close the arms 21 under the control of the cam 23a. The cam 23a is so shaped that the cam follower 26 leaves the cam as a pair of gripping elements are at the take-out station A in position to grip a pair of bottles in the open mold. This permits the spring 30 to hold the gripping elements 19 in closed position until they have removed the bottles from the mold and carry them to a discharge position over the conveyor 17. By the time the discharge position is reached, the cam 23a has operated the rocker arm assembly 25 to open the gripping elements 19 sufficiently to release the bottles to the conveyor.

As shown on FIG. 3, the gripping elements 19 are journaled in an outer bearing 21a mounted at the end of each arm 21 of the carrying frame. Each gripping element is provided with a vertical shaft 19a pin connected to the tong portions of the gripping elements and shaft 19a extends through bearing 21a sufficiently to permit vertical movement of the gripping elements between raised and lowered positions. The gripping elements 19 are held in their lowered position by assembly of a coil spring 31 compressed between an integral lug 32 threaded at the end of each vertical shaft 19a and the underside of arm 21. The gripping elements are actuated to their raised position through a lever means comprising a first lever 33 having one end engaged with lug 32 and pivoted at its other end by a pin connection 34 held in a bracket 35 on each arm 21, and a second lever 36 pivoted intermediate its length at pin 37, the outer end of the second lever having a projection 38 bearing against the first lever 33 and its opposite end pin connected by pin 40 through rod 39 (FIGS. 3–5). Rod 39 is journaled in the carrying frame 18. Its uppermost end terminates internally at the lower end of sleeve 41 which houses a cylinder 42. The cylinder 42 has a tooth projection 43 fitting in a matching slot 44 at the end of rod 39. The tooth and slot connection prevents rotation of the cylinder 42 within sleeve 41. Internally of cylinder 42 is a piston plunger 44 having an integral end mounting 45 for a cam roller 46. Cam roller 46 is pivotally mounted on pin 47 of end mounting 45. Piston 44 has a transversely bored slot 48 through which a pin 49 is inserted to limit the vertical movement of piston 44 in cylinder 42. A coil spring 50 is compressed between the end mounting of piston 44 and the upper-end of its cylinder 42. The pin 49 in slot 48 retains spring loaded piston 44 in cylinder 42 and permits inward travel of the piston into the cylinder a distance equal to the throw of the cam 51, the latter to be presently described.

A stationary cam 51 is bolted to a stationary upper spider 52 keyed on stationary column 24 of the take-out machine 10. As shown on FIG. 1, cam 51 is located so that it will engage with cam roller 46 after the arms 21 carrying the gripping element are closed about the bottles in the mold at the take-out station A. As seen in FIGS. 3 and 5, the cam roller 46, after it engages with cam 51, depresses piston 44, cylinder 42, and rod 39 progressively until the full throw of the cam has been spanned. In so doing, the lever means is actuated by pivoting the second lever 36 clockwise about its pin 17, and projection 38 bears against the underside of the first lever 33, thereby pivoting it clockwise about its pin 34. This action overcomes the spring means for keeping the gripping elements in their lowered position and raises them along with their gripped pair of bottles at take-out station A, thereby freeing the bottles from the mold surface when the paths of the gripping elements and the containers are tangent so that they are stationary with respect to each other. Lifting the bottles at this point prevents dragging them on the mold surface and eliminates damage caused by moving them across the mold bottom.

As seen on FIGS. 3 and 4, an adjusting screw 62 is threaded through cross member 63 integral with the second levers 36 and locked in position by a locking nut 64. This is adjustable to define the lowered position of the gripping elements 19 by having screw 62 engageable with the underside of the take-out arm 11. It provides a stop for counterclockwise rotation of the levers 33 and 36, and holds the cam roller 46 at the proper elevation for engagement with the leading or beginning end of cam surface 51.

Cam 51 is held stationary at the desired position by bolts 53 extending through a slot 54 in the cam and threaded into the stationary upper spider 52. The position of cam 51 is adjustable to the proper location with respect to the aforementioned tangent point by loosening bolts 53 and turning the vernier adjustment assembly 55. Operation of this adjustment assembly 55 will now be described.

A mounting member 56 is bolted to the upper spider 52 at the opposite side and along the central axis of the turret from the peripheral cam surface of cam 51 (FIG. 2), and member 56 accommodates an adjusting screw 57, the latter being keyed to mount adjusting wheel 58 (FIG. 6). When the clamping bolts 53 are loosened, cam 51 is rotatable a limited amount in either direction about the pivot point 59 fitting into a matching bore in the upper end of the stationary column 24. The limits of rotational adjustment are defined by slot 54. The screw 57 is carried in a correspondingly threaded portion of a grooved member 60 insertable in the end slot 61 of the stationary cam 51. By turning the adjusting wheel 58 in one direction, the cam 51 is pivoted about its pivot point 59 in a corresponding direction of rotation to either advance or retard the position of its cam surface with respect to the take-out station A.

Referring again to FIG. 3, the linkage between the cam follower 46 and the lever means, namely, the second lever 36, is shown constructed to provide a safety device to prevent damage to the take-out mechanism in the event that it becomes jammed or its raising movement interfered with at the time the cam follower 46 engages cam 51. The coil spring 50 is selected to provide sufficient resistance before yielding that it will not compress or yield during lifting the normal load requirements presented by take-out of the bottles under normal conditions. However, should an interference with the gripping elements occur, resistance to movement presented at rod 39 by the jammed elements upon depression of the cam follower 46, spring 50 will then compress and plunger 44 extend into cylinder 42. By this means, if the take-out mechanism is jammed, such as by interference with the mold due to improper position synchronizing action, the mechanism will not be harmed since the spring will yield and permit piston travel to take up the entire depressing movement of the linkage as it is actuated by engagement of the stationary cam.

As shown in FIG. 4, the gripping elements 19 engage the bottle necks beneath the bottle finish permitting the bottles to be securely held during transfer without being tightly gripped or subjecting the bottles to pressure which may mar or distort them while still hot or somewhat plastic.

The gripping elements 19, as shown on FIG. 1, travel in a path substantially tangent to the path of the finishing molds or mold cavities as they rotate about the central axis of the blowing machine. Specifically, the vertical mounting shafts 19a of the bottle gripping means, while passing through the take-out station A, are moving in an arc tangent to an arc 71, the latter being concentric with arcs 72 on the center axis of the bottles as they are carried by the molds 14. The arcs 72 also represent the paths of the closed mold cavities.

The linear speed of the conveyor 17 is often substantially less than that of the molds 14. The take-out machine is designed to speed up the transfer elements as they approach the take-out position and slow them down as they approach the discharge position B over the conveyor 17. In so doing, the take-out arms 11 are moved with and at the same linear speed as the molds as the arms 11 each approach the take-out station where the bottles are picked up. Each of the arms will be slowed down to the speed of the conveyor at the time the bottles are released thereto. This accelerating and decelerating of the take-out arms 11 (FIG. 1) is accomplished by pivoting them in either direction about their pivot points 20 on turret 16 and the proper acceleration or deceleration of each take-out arm 11 is controlled by a stationary cam surface of a cam slot 80 on the underside of spider 52. Cam slot 80 accommodates a roller 81 for each transfer arm 11 and each roller 81 is pivotally mounted on a bell crank arm 82 integral with the take-out arm 11 along its pivotal connection to turret 16 at pin 20 (FIG. 3). As the pair of gripping elements 19 of each take-out arm 11 approaches the take-out station A, the cam 80 is about to begin swinging the arm 11 in a forward direction about its pivot 20 in addition to bodily movement of the arm about the central axis of the turret 16. This forward swinging movement equates the linear speed of the gripping elements with the linear speed of the bottles in the mold until after the bottles are gripped and raised from the mold and is continued until the position C is reached (FIG. 1). Thereafter, the movement is slowed down as the discharge position B is approached so that when bottles held in the gripping elements are over the conveyor 17, they are discharged thereto while traveling at conveyor speed and deposited in an upright manner without being tipped over. The slower movement of the gripping elements may be continued beyond the discharge point to approximately the position D so that the elements are permitted to clear the discharged bottles. After reaching the position D, the take-out arm 11 is again accelerated.

As used herein, the terms "gripping elements," "gripping means," and "article holder" are each intended to include a device capable of opening and closing movement to grasp and carry a molded article to transfer it from its molding machine support to a remote point.

It should be understood that various details of construction and procedure may be modified through a wide range without departing from the principles of this invention, and it is, therefore, not the purpose to limit the patent granted hereon otherwise than necessitated by the scope of the appended claims.

We claim:

1. In a revolving turret type article takeout device having at least one takeout arm adaptable to travel, during rotation of the turret, through an article takeout station for taking and transferring molded articles from their supported position on their mold bottom support on the rotary carriage of a molding machine, the improvement thereof comprising an article holder connected on said takeout arm, said holder comprising an opposed pair of corresponding gripping elements operable between open and closed positions which are adapted to grip one or more articles therebetween when closed, a carrying frame for said gripping elements, said frame including a pair of arms pivotally mounted on the takeout arm and operable for movement toward and away from each other, means connected to said pair of arms for automatically opening and closing the gripping elements, a vertical journal mounting on said arms for said gripping elements to provide for vertical movement of the latter thereon, lever means pivoted on the takeout arm and connected at its outer end to each of the said gripping elements for moving them collectively between lowered and raised positions on their said arms of the carrying frame, springs each compressed against one of the arms of the carrying frame and connected to the corresponding gripping element on that arm and biasing said lever means to normally hold the gripping elements in their lowered position, and means operable at the takeout station for actuating said lever means after the gripping elements are closed to overcome the means biasing said lever means and thereby move the gripping elements to their raised position, whereby to raise gripped articles free of their mold bottom support for takeout of the articles from the molding machine.

2. The device defined in claim 1, wherein the lever means comprises a pair of first levers pivotally mounted on the carrying frame near one of their ends for vertical pivotal movement, their other ends being engageable with corresponding gripping elements, a second lever pivotally mounted intermediate its length for vertical pivotal movement, one end thereof being engageable with each of said first levers for pivoting them vertically upwardly and the other end of said lever operatively connected to the means for actuating the said lever means.

3. In a revolving turret type article takeout device having at least one takeout arm adaptable to travel, during rotation of the turret, through an article takeout station for transferring molded articles from their supported position on their mold bottom support on the rotary carriage of a molding machine, the improvement thereof comprising an article holder connected on said takeout arm, said holder comprising an opposed pair of corresponding gripping elements operable between open and closed positions which are adapted to grip one or more articles therebetween when closed, a carrying frame for said gripping elements, said frame including a pair of arms pivotally mounted on the takeout arm and operable for movement toward and away from each other, means connected to said pair of arms for automatically opening and closing the gripping elements, means on each said arm for mounting said gripping elements for vertical movement, lever means pivoted on the takeout arm and connected at its outer end to each of the said gripping elements for moving them collectively between lowered and raised positions, means biasing said lever means for normally holding the pair of gripping elements in their lowered position, and means operable at the takeout station for actuating said lever means after the gripping elements are closed to move the gripping elements to their raised position, comprising a linkage shiftable on the takeout arm and connected at one end to the said lever means, a cam follower connected to the other end of the linkage, and a cam engageable with said cam follower upon rotation of said takeout arm to the takeout station and after the above-mentioned means automatically closes the gripping elements to grip articles, whereby to raise gripped articles free of their mold bottom support for taking them from the molding machine.

4. The device defined in claim 3, wherein the means connecting the cam follower to the rod comprises a cylinder carried at one end of the rod, a piston carried in said cylinder, restrained therein for limited reciprocated movement, a mounting member integral with the outer end of the piston and having the cam follower mounted thereon, a compressible spring between the mounting member and the cylinder biasing movement of the piston into said cylinder, said spring being of such strength that it is unyieldable in overcoming the normal resistance of the lever means for lifting an article by the gripping elements and is yieldable when more than said normal resistance is presented for operation of the lever means to raise said gripping elements, whereby, in the latter circumstance relative movement is permitted between the piston and cylinder when the cam and cam follower engage to prevent damage to the mechanism.

5. The device defined in claim 3 wherein the stationary cam is adjustably mounted on a frame and pivotal about the central axis of the turret, and including a vernier adjusting means attached to the frame and operatively connected to said cam operable for manually advancing or retarding said cam relative to the takeout station.

6. The device defined in claim 3, wherein the leading end of the stationary cam is tapered to actuate the cam follower progressively during takeout of a gripped article.

7. The device defined in claim 6, wherein the ratio of vertical movements of the gripping elements to the cam follower is at least 3 to 1.

8. In a revolving turret type article takeout device having a takeout arm adaptable to travel, during rotation of the turret, through an article takeout station for taking molded articles from their mold bottom support on the carriage of a molding machine, and through an article discharge station for transferring the articles to a conveyor, an article holder connected on said takeout arm, said holder comprising an opposed pair of corresponding gripping elements operable between open and closed positions which are adapted to grip an article therebetween when closed, a carrying frame for said gripping elements, said frame including a pair of arms pivotally mounted on the takeout arm and operable for movement toward and away from each other, means connected to said pair of arms for automatically opening and closing the gripping elements, a vertical slide mounting on each said arm adapting said gripping elements for vertical movement, lever means pivoted on the takeout arm and connected at its outer end to each of said gripping elements for moving them collectively between lowered and raised positions on said arms, a yieldable means compressed between each of the gripping elements and the carrying frame and connected for biasing said lever means to normally hold the gripping elements in their lowered position, lever operating means engageable to further compress the yieldable means and move the gripping elements to their raised position, and means automatically engaging the lever operating means at the takeout station after the gripping elements are closed, thereby raising the gripped article free of its mold bottom support, said means sequentially automatically disengaging the lever operating means as the takeout arm is advanced intermediate the takeout station and the discharge station, whereby the article is lowered for discharge at the latter said station.

9. In a revolving turret type article takeout device having at least one takeout arm adaptable to travel, during rotation of the turret, through an article takeout station for taking and transferring molded articles from their supported position on their mold bottom support on the rotary carriage of a molding machine, the improvement thereof comprising an article holder connected on said takeout arm and operable to assume open and closed positions for respectively releasing and grasping one or more said articles, means for automatically opening and closing the article holder, said means closing the article holder at the takeout station, a vertically disposed slide mounting on said takeout arm for said article holder which provides for vertical movement of said article holder relative to said takeout arm between lowered and raised positions, a compressed, resilient means connected between said article holder and said takeout arms for normally maintaining the article holder in its lowered position, and means operable at the takeout station for further compressing said resilient means and thereby actuating the article holder upwardly to raised position after it is closed to grasp said articles, thereby lifting said articles upwardly from their said supported position to free said articles from said bottom plate support.

References Cited in the file of this patent

UNITED STATES PATENTS

| | | |
|---|---|---|
| 2,096,264 | Schutz | Oct. 19, 1937 |
| 2,415,997 | Eldred | Feb. 18, 1947 |
| 2,575,123 | Pollard | Nov. 13, 1951 |
| 2,730,251 | Schutt | Jan. 10, 1956 |
| 2,741,379 | Stryker | Apr. 10, 1956 |
| 2,748,920 | Morgan | June 5, 1956 |
| 2,807,227 | Kerns | Sept. 24, 1957 |
| 2,830,712 | Sykokis | Apr. 15, 1958 |
| 2,888,131 | Allen | May 26, 1959 |